Oct. 14, 1947.　　　E. J. COLE　　　2,428,783
GRIP BOLT
Filed April 13, 1944　　　2 Sheets-Sheet 1
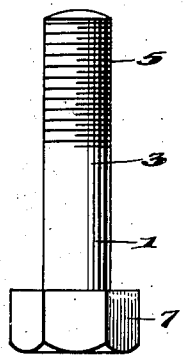
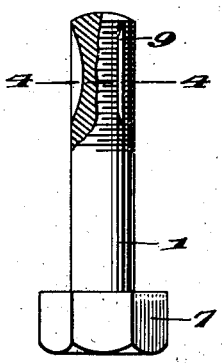
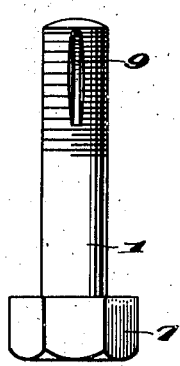
Fig. 1.　　Fig. 2.　　Fig. 3.
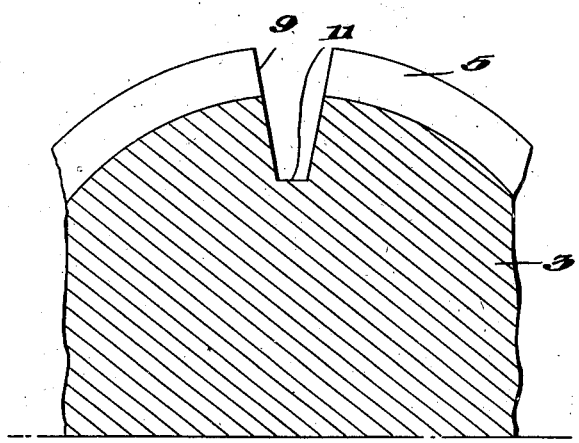
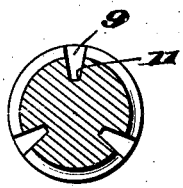
Fig. 4.
Fig. 5.
Inventor
EDWARD J. COLE,
By Leech & Radue,
Attorneys Oct. 14, 1947.                E. J. COLE                2,428,783
                               GRIP BOLT
                    Filed April 13, 1944        2 Sheets-Sheet 2

Inventor
EDWARD J. COLE,
By Leech o Radue,
Attorneys

Patented Oct. 14, 1947

2,428,783

UNITED STATES PATENT OFFICE 2,428,783

GRIP BOLT

Edward J. Cole, Peekskill, N. Y.

Application April 13, 1944, Serial No. 530,807

7 Claims. (Cl. 151—14)

This invention relates to a standard grip bolt and to a method of preparing such a bolt, and more especially to a grip bolt or cap screw which may be readily fabricated from a standard threaded bolt of any size or description or from a previously prepared blank before threading.

An object of the invention is the processing, by a series of simple steps, a standard threaded bolt in such a manner that when a conventional threaded nut or other threaded part is threaded thereon the nut or other threaded part will be gripped or held without distorting or destroying the threads thereof, while maintaining the nut or other threaded part on the bolt in a firm through removable position.

A further object is to modify a standard bolt or cap screw in such a manner that when coupled with a conventional threaded nut the modified thread of the bolt or cap screw will take up all play or tolerance and create a pressure between the threads of the bolt and cooperating nut or other threaded part. Thus the parts are maintained in tight frictional control without the use of jamb nuts, lock washers or the like and the threaded members will not work loose when subjected to shock and vibration.

Heretofore many proposals have been made to accomplish this object, but all of the prior suggestions have necessitated the formation of special bolts with special threads, which are costly to manufacture or result in destroying of the thread of the bolt and/or nut. By following the teachings of this invention a standard bolt or cap screw is produced which will have considerable binding and elastic retention grip action on the threads of a standard nut or other threaded part and in so doing will prevent the nut or other threaded part from working loose.

In the drawings:

Fig. 1 is an illustration of a standard SAE bolt, and it is intended to represent any conventional type of bolt or cap screw;

Fig. 2 illustrates the standard threaded bolt, partly in cross-section, initially processed by forming a groove or a plurality of equi-spaced grooves therein which are V-shaped in cross-section and arcuate in formation along the bottoms of the slots;

Fig. 3 shows a standard bolt after it has been slotted and one of its slots flared or spread;

Fig. 4 is a cross-section through the initially processed bolt taken on line 4—4 of Fig. 2;

Fig. 5 is an enlarged fragmental sectional view showing the formation of the curved V-shaped groove in association with a standard thread formed on the threaded portion of the bolt;

Figure 6:
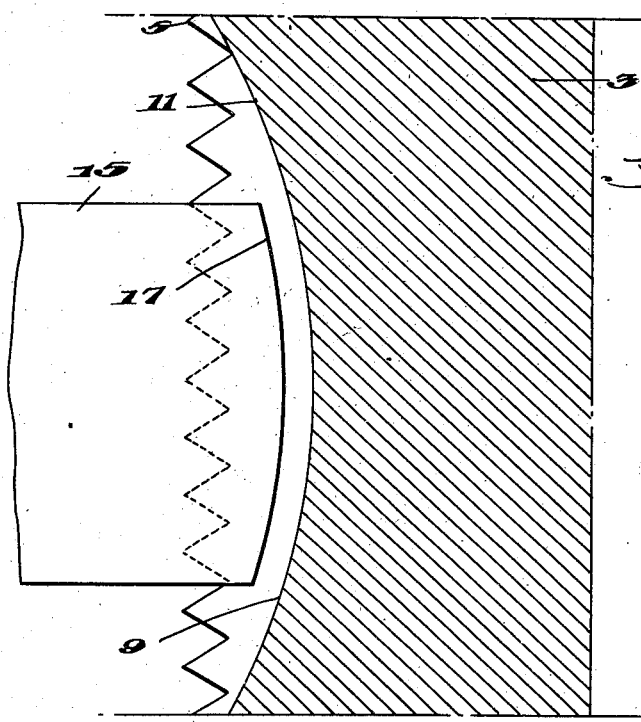
Figure 7:
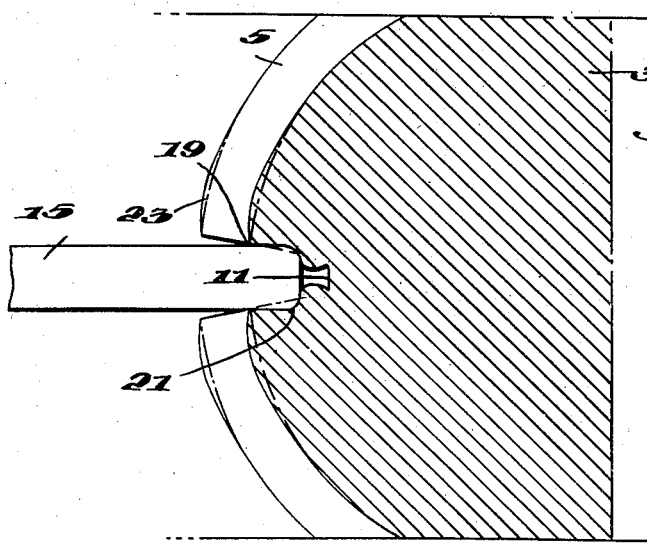

Fig. 6 is an enlarged sectional view illustrating the manner of spreading or flaring the central portion of each of the V-shaped grooves by means of an arcuate faced tool; and Fig. 7 is an enlarged sectional view illustrating the form of the spreading tool per se shown in Fig. 6 and the manner in which the tool contacts a portion of the V-shaped groove beginning at or near the root of the thread and displaces the metal of the thread on either side of the groove.

Specifically, in the drawings numeral 1 denotes a conventional standard bolt which in the form shown has the customary shank 3, outer threaded end 5, and integral wrench engaging head 7. Such a standard bolt is cut or slit to provide one or more longitudinally extending slots 9 therein. These slots preferably extend from the beginning of the thread 5 through any desired portion of the threaded part of the shank 3, and as shown in Figs. 2 and 4 the slots 9 are V-shaped in cross-section and have an arcuate or curved bottom wall line. It is desirable to cut or slot the V-shaped groove or grooves 9 into the threaded portion of the bolt so that the arcuate bottom wall 11 thereof is flat, or can be rounded if desired, as illustrated in enlarged view 5. It will be obvious to those skilled in the art that the series of longitudinal, arcuate V-shaped slots 9 may be ground, pressed or cut into the bolt simultaneously by any suitable type of machinery.

After the plurality of V-shaped slots 9 have been formed in the bolt it is thereafter processed to form the thread or retention grip in the manner disclosed in Figs. 6 and 7.

Fig. 6 shows a manual or automatically projected flaring tool 15 after it has been inserted into one of the V-shaped grooves 9. It will be observed that the forward end or working face 17 of the tool 15 is arcuate and of the same radius as the curved bottom 11 of the V-shaped groove 9, although of lesser width than the length of the groove.

Referring now to Fig. 7, it will be observed that the thickness of the tool 15 is such that when inserted in the V-shaped groove 11 it will contact the side converging walls of the groove 9 at a point approximately at the root of the bolt thread 9. This first point of contact by tool 15 is indicated by the numeral 19. The tool is then forced into the groove 9 for a substantial distance below the point 19 but not to the bottom of the groove. During this forcing or flaring movement the rounded end 21 of the tool 15 laterally displaces the metal of the thread 5 immediately adjacent the side walls of the groove 9. This displacement and flow of metal is indicated by the numeral 23 and the dotted lines in Fig. 7. As before stated the flaring tool 15 is not forced to the bottom of the groove 9 and consequently the tool does not strike the arcuate bottom wall 11 thereon and its movement is only sufficient to flare or bulge the thread 5 throughout the width of the tool 15. The resulting form is shown in Fig. 3. All of the slots 9 are thus similarly treated and the result is a standard bolt having a plurality of slightly flared or bulged portions spaced around its periphery.

In use a nut or threaded member can be readily turned on to the outermost portion of the bolt and as soon as the thread of the nut comes into contact with the bulged or flared portions 23 of the bolt the play or looseness is taken up and the flared portions 23 of the bolt bind against the threads of the bore. A tight grip is thus produced which defeats accidental removal of the nut, as by vibration, shock, etc., but does not prevent the nut to be removed therefrom by means of a wrench. The nut may be applied and taken off of a bolt formed according to this invention many times without destroying the effectiveness of the grip and without harming the thread of the co-operating threaded member.

I claim:

1. A grip bolt for use with a standard threaded member, said bolt having a conventionally threaded shank, one or more longitudinally extending slots of arcuate form and V-cross-section spaced around the threaded portion of the shank, the thread on said bolt being flared adjacent each side of said slots beyond the normal diameter of the remainder of the thread.

2. A frictional grip bolt for use with a conventionally threaded member comprising a threaded shank, a series of longitudinal slots extending through a portion only of the threaded section of the shank, the said slots having outwardly flared portions adjacent the side edges of the slots and extending slightly beyond the periphery of the unflared portions of the shank thread.

3. A grip bolt for use with a conventionally threaded member comprising a standard threaded shank having a plurality of longitudinally extending slots formed in the threaded portion thereof, each of said slots being V-shaped in cross-section and of arcuate form, the metal immediately adjacent the midsection of the side walls of the V-shaped sloped slots being flared whereby the adjacent shank thread is of larger diameter than the remainder of the thread.

4. A threaded grip bolt adapted to frictionally bind the thread of a cooperating nut or the like wherein the threaded portion of the bolt has a series of straight, parallel, spaced apart slots cut therein for less than the length of the threaded portion with the outer side edges of the slots flared into a bulge radially and for a limited distance circumferentially.

5. A grip bolt as defined in claim 4 wherein the said series of slots are equi-spaced around the periphery of the thread portion of the bolt and the flared areas are separated by areas of normal thread.

6. A grip bolt as defined in claim 4 wherein the said slots are generally V-shaped in cross-section and arcuate in form from end to end.

7. A grip bolt as defined in claim 4 wherein the said slots are arcuate in longitudinal section and the outer side edges of the slots are outwardly flared in their central portions and gradually taper toward each end.

EDWARD J. COLE.

REFERENCES CITED

The following references are of record in the file of this patent:

UNITED STATES PATENTS

| Number | Name | Date |
|---|---|---|
| 1,495,687 | Grosclaude | May 27, 1924 |
| 1,761,581 | Northey et al. | June 3, 1930 |
| 2,251,201 | Purtell | July 29, 1941 |
| 1,059,260 | Barrett | Apr. 15, 1913 |
| 1,210,310 | Hickling et al. | Dec. 26, 1916 |
| 909,033 | Smith | Jan. 5, 1909 |
| 1,158,454 | De Camp | Nov. 2, 1915 |
| 33,487 | Marsh | Oct. 15, 1861 |
| 1,874,657 | Trotter | Aug. 30, 1932 |
| 1,363,710 | Best | Dec. 28, 1920 |
| 2,266,758 | Holtz | Dec. 23, 1941 |
| 2,251,201 | Purtell | July 29, 1941 |
| 949,741 | Loehr | Feb. 15, 1910 |
| 2,232,336 | Meersteiner | Feb. 18, 1941 |
| 2,302,675 | Cherry | Nov. 24, 1942 |
| 1,235,626 | Woodward | Aug. 7, 1917 |

FOREIGN PATENTS

| Number | Country | Date |
|---|---|---|
| 127,840 | Switzerland | Sept 17, 1928 |